(12) United States Patent  (10) Patent No.: US 8,125,325 B2
Liou  (45) Date of Patent: Feb. 28, 2012

(54) INTEGRATED DRIVING ASSISTANCE APPARATUS

(75) Inventor: Jyh-Chiang Liou, Johnghe (TW)

(73) Assignees: Three-In-One Ent. Co., Ltd., Sanchong, Taipei County (TW); Jyh-Chiang Liou, Jhonghe, Taipei County (TW)

( * ) Notice: Subject to any disclaimer, the term of this patent is extended or adjusted under 35 U.S.C. 154(b) by 345 days.

(21) Appl. No.: 12/561,060

(22) Filed: Sep. 16, 2009

(65) Prior Publication Data

US 2010/0066527 A1  Mar. 18, 2010

(30) Foreign Application Priority Data

Sep. 17, 2008 (TW) .............................. 97216788 U (51) Int. Cl.
*B60Q 1/00* (2006.01)
(52) U.S. Cl. ........ 340/461; 340/435; 340/436; 340/459; 340/462; 340/903; 340/905; 348/148; 382/103; 382/104
(58) Field of Classification Search .................. 340/461, 340/435, 436, 459, 462, 903, 904
See application file for complete search history.

(56) References Cited

U.S. PATENT DOCUMENTS 5,414,439 A * 5/1995 Groves et al. ..................... 345/7
2005/0143895 A1 * 6/2005 Kato ............................... 701/96

FOREIGN PATENT DOCUMENTS

| JP | 2005-014845 | 1/2005 |
| TW | 582349 | 4/2004 |
| TW | M249874 | 11/2004 |

* cited by examiner

*Primary Examiner* — Tai T Nguyen
(74) *Attorney, Agent, or Firm* — Snell & Wilmer L.L.P.

(57) ABSTRACT

An integrated driving assistance apparatus is provided, which is installed in a vehicle with a headlight, a turn signal light, and a side-view mirror. The integrated driving assistance apparatus includes a detector, an infrared emitter, an image sensor, and an image processor. The detector is configured to detect whether the headlight and the turn signal light are turned on or off respectively. The infrared emitter is located on the side-view mirror and irradiates infrared rays when the detector detects that the headlight is turned on. The image sensor is located on the side-view mirror for capturing an image of an area beside the vehicle. The image processor is coupled to the image sensor and the detector and configured to receive and process the image to generate a warning signal. When the detector detects that the turn signal light is turned off, the image processor processes the image for a lane deviation alarm, and when the detector detects that the turn signal light is turned on, the image processor processes the image for a blind spot detection alarm.

22 Claims, 8 Drawing Sheets

INTEGRATED DRIVING ASSISTANCE APPARATUS

CROSS REFERENCE TO RELATED APPLICATIONS

This application claims the right of priority based on Taiwan Patent Application No. 097216788, entitled "INTEGRATED DRIVING ASSISTANCE APPARATUS," filed on Sep. 17, 2008, which is incorporated herein by reference.

FIELD OF THE INVENTION

The present invention relates to an integrated driving assistance apparatus, and more particularly to an integrated driving assistance apparatus capable of improving night-visibility and providing a lane deviation alarm, a blind spot detection alarm, and a panoramic image.

BACKGROUND OF THE INVENTION

People rely on transportation more heavily with the development of urbanization and industrialization. To improve driving safety, a variety of safety protection apparatuses or assistance apparatuses have been developed.

For example, a driver often checks whether there is an object by a side-view mirror when making a lane change or a turn. However, many kinds of side-view mirrors include a blind spot for driving vision. Therefore, some vehicles are configured with a blind spot detector to improve driving safety. Taiwan Patent Published No. M249874 disclosed a blind spot detector for vehicles, which includes multiple radars at two sides of the vehicle to detect objects in the region of a blind spot for driving vision.

Besides, some vehicles are equipped with auxiliary infrared illumination to help the driver get better vision for driving at night or in the rain. For example, Japan Patent Published No. P2005-14845A disclosed a common auxiliary infrared illumination. Generally speaking, the light source of an infrared ray is combined with the headlight set, and the infrared camera is located on front side of the vehicle body, such as back of the side-view mirror, to capture an image in front of the vehicle. The image captured by the infrared camera is shown by an indicator to serve as a driving reference for the driver.

On the other hand, occasionally one may encounter some dangerous driving, including an S-turn way or lane deviation, when the driver is tired. Therefore, some vehicles are equipped with a lane deviation alarm system to send the warning signal when the lane deviation is detected. For example, Taiwan Patent Published No. 582349 disclosed a warning apparatus, which is located at both front sides of the vehicle and used to send the warning signal to warn the driver while the vehicle deviates from the lane.

However, each apparatus above-mentioned is in operation independently. As a result, if a consumer needs an integrated driving assistance system with more complete vision-based functions, he needs to install different assistance apparatuses with different functions respectively, which is time-consuming and effort-consuming.

For this reason, it's necessary to provide an integrated driving assistance apparatus for driving vision to improve driving safety completely.

SUMMARY OF THE INVENTION

In view of the disadvantages in the prior art, the present invention provides an integrated driving assistance apparatus capable of improving night-visibility, providing a lane deviation alarm and a blind spot detection alarm, and enhancing the driving safety completely.

According to one aspect of the present invention, the present invention provides an integrated driving assistance apparatus, which is installed in a vehicle with a headlight, a turn signal light, and a side-view mirror. The integrated driving assistance apparatus includes a detector, an infrared emitter, an image sensor, and an image processor. The detector is configured to detect whether the headlight and the turn signal light are turned on or off respectively. The infrared emitter is located on the side-view mirror and irradiates infrared ray when the detector detects that the headlight is turned on. The image sensor is located on the side-view mirror for capturing one image of both side areas of the vehicle. The image processor is coupled to the image sensor and the detector and configured to receive and process the image to generate a warning signal. When the detector detects that the turn signal light is turned off, the image processor processes the image for a lane deviation alarm, and when the detector detects that the turn signal light is turned on, the image processor processes the image for a blind spot detection alarm.

In one embodiment, the integrated driving assistance apparatus of the present invention further includes four ground image sensors configured to capture a rearward ground image, a frontward ground image, a rightward ground image, and a leftward ground image of the vehicle respectively to generate a corresponding panoramic image by the image processing.

Some of the other aspects of the present invention will be illustrated in the following description, and the others will be easily understood by explanation or understood by practice of the present invention. Each aspect of the present invention will be understood and achieved by using the elements and the combination thereof specially indicated in the attached claims below. It should be understood that the content above and the following detailed description are only for illustrating by examples, it is not used to limit the invention.

DETAILED DESCRIPTION OF THE INVENTION

The present invention discloses a multifunctional and integrated auxiliary apparatus for driving vision. In order to make its illustration more detailed and complete, the following description with accompanying drawings of FIGS. 1-7 can be referenced. However, the apparatus, elements, and means described in the following embodiments are only used to illustrate the invention, and are not intended to limit the scope of the invention.

Figure 1:
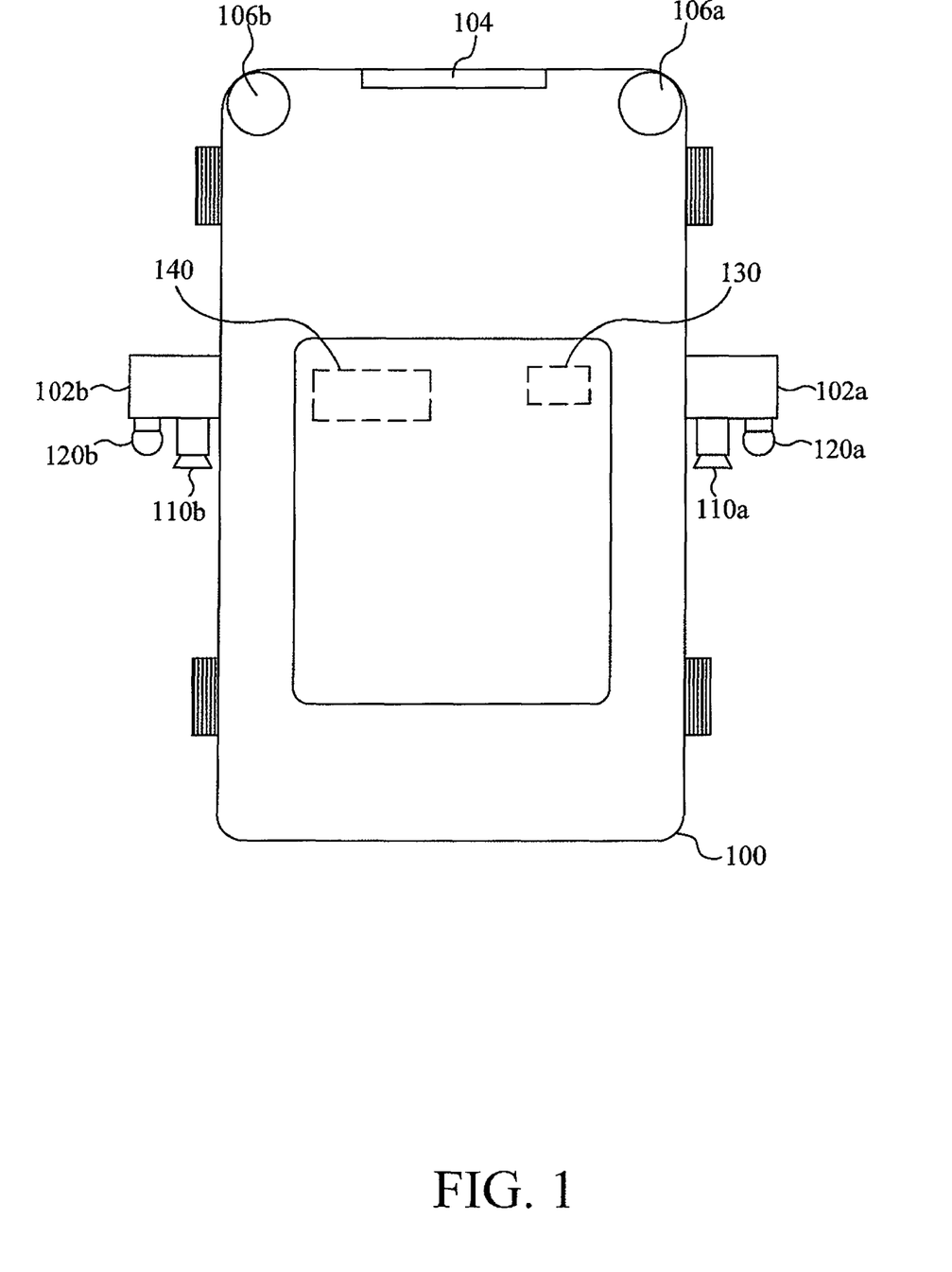
FIG. 1 is a schematic diagram illustrating an integrated driving assistance apparatus according to the present invention.

FIG. 1 is a schematic diagram illustrating an integrated driving assistance apparatus according to the present invention. As shown in FIG. 1, the integrated driving assistance apparatus is applied to a vehicle 100 with side-view mirrors 102a and 102b, a headlight 104, and turn signal lights 106a and 106b. The integrated driving assistance apparatus of the present invention includes image sensors 110a and 110b and infrared emitters 120a and 120b located on the side-view mirrors 102a and 102b respectively, wherein the image sensors 110a and 110b are configured to capture the image around the vehicle 100, and the infrared emitters 120a and 120b are configured to irradiate infrared ray. The integrated driving auxiliary apparatus of the present invention further includes an image processor 130 and an indicator 140. The image processor 130 receives the image captured by the image sensors 110a and 110b and processes the image for a lane deviation alarm or a blind spot detection alarm. According to a result of the image processing, the image processor 130 then generates a warning signal to the indicator 140. The indicator 140 shows the warning signal to serve as a driving reference for a driver.

According to an embodiment of the present invention, when the headlight 104 is turned on, the infrared emitters 120a and 120b will be turned on automatically, and when the headlight 104 is turned off, the infrared emitters 120a and 120b will also be turned off automatically. Because the headlight 104 is generally turned on at night or under poor sight conditions, it follows to turn on the infrared emitters 120a and 120b to serve as the auxiliary illumination so that the image sensors 110a and 110b can acquire and send clear images to the image processor 130 for image processing.

The image sensors 110a and 110b simultaneously acquire both images of the visible and infrared or can include different sensor units for visible light and infrared respectively. In an embodiment of the present invention, each of the image sensors 110a and 110b can be a complementary metal oxide semiconductor (CMOS) image sensor or a charge coupled device (CCD) image sensor.

Figure 2:
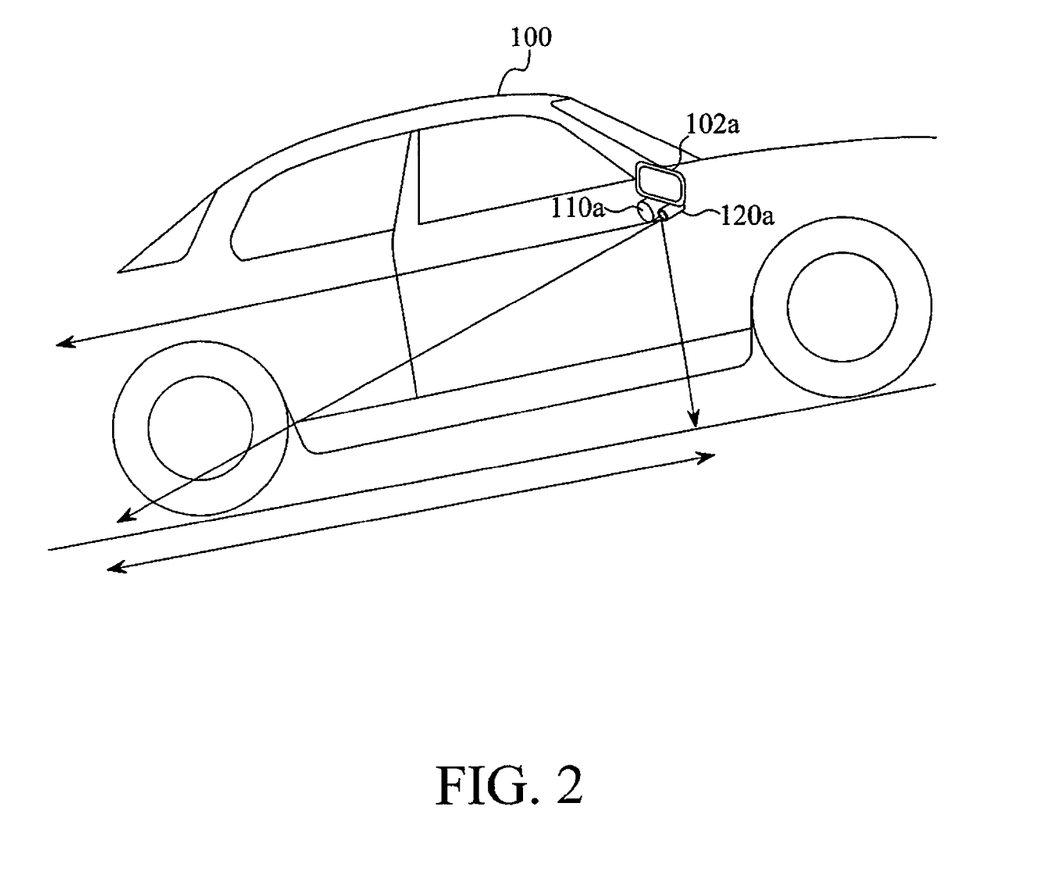
FIG. 2 is a schematic diagram illustrating the location and capturing range of the image sensor and the infrared emitter of FIG. 1.

In an embodiment, the image sensors 110a and 110b and/or the infrared emitters 102a and 102b can be connected to the side-view mirrors 102a and 102b through a drive unit (not shown). The drive unit can control the angle of the image sensors 110a and 110b to capture the image and/or the angle of the infrared emitters 120a and 120b to irradiate infrared rays. For example, the drive unit, including a stepper motor and a gear, is used for driving the image sensors 110a and 110b and/or the infrared emitters 120a and 120b to rotate or shift. FIG. 2 illustrates the mounting location and action sphere of the image sensor 110a and the infrared emitter 120a. The image sensor 110a and the infrared emitter 120a of the present invention can respectively detect and illuminate the right underneath area and right rear area of the vehicle 100 so that not only an object in the right side blind spot of the vehicle 100 but also a line of the lane on the road can be detected.

The image processor 130 receives and processes the image signal from the image sensors 110a and 110b, and generates a corresponding warning signal to the indicator 140. According to an embodiment of the present invention, when the turn signal lights 106a and 106b are turned on, the image processor 130 will process the image for the blind spot detection alarm. The blind spot detection alarm is used to check whether any vehicles or objects are beside the vehicle 100 based on the image captured by the image sensors 110a and 110b. When both the turn signal lights 106a and 106b are turned off, the image processor 130 will process the image for the lane deviation alarm. The lane deviation alarm is used to monitor a distance between the vehicle body and the line of the lane on the road based on the image captured by the image sensors 110a and 110b. Generally speaking, the turn signal lights 106a and 106b will be turned on when the driver intends to make a turn or a lane change. At that time, the image processor 130 processes the image for the blind spot detection alarm, which can provide the driver more complete driving information so that the driver can notice the object beside the vehicle to avoid the accident when turning or changing lanes. When the turn signal lights 106a and 106b are turned off, the vehicle 100 often goes straight. At that time, the image processor 130 processes the image for the lane deviation alarm, which can warn the driver to take an immediate and suitable reaction to avoid dangerous driving events.

The indicator 140 is used for receiving and showing the warning signal from the image processor 130 to provide the road information to the driver, which can achieve the function of assisting driving vision. The indicator 140 can show the warning signal in various manners, using the senses of hearing, visual perception, or touch, whatever can make alarms to warn the driver, such as showing images, sending voice warning, sending voice and light warning, and generating vibration. For example, the indicator 140 can be a liquid crystal display (LCD), an organic light emitting diode (OLDE) display, a plasma display, or a cathode ray tube (CRT) display. The indicator 140 also can be a horn, a vibrator, an LED lamp, or the combination thereof In addition, the present invention does not limit the location of the indicator 140 as long as it can catch driver's attention immediately. For example, the indicator 140 can be located wherever it is convenient to the driver to see, such as the vehicle instrument panel or the side-view mirrors 102a and 102b. In another embodiment, the indicator 140 can include a projector configured to output the image signal and project the image signal onto a front windshield of the vehicle 100.

In an embodiment, the indicator 140 can receive the warning signal from the image processor 130 through a variety of wire transmission interfaces, such as USB, IEEE1394, RS232, and the like. In another embodiment, the indicator 140 can receive the warning signal from the image processor 130 through a variety of wireless transmission interfaces, such as Bluetooth, infrared, wireless USB, and the like.

The driving assistance apparatus of the present invention can further include a synchronous circuit (not shown) to control the operation of the infrared emitters 120a and 120b and image sensors 110a and 110b. For example, the synchronous circuit will transmit a capturing signal to the image sensors 110a and/or 110b every capturing interval, for example, 1/60 second, to enable the image sensors 110a and/or 110b to capture the image. Besides, the synchronous circuit can also transmit a triggering signal to the infrared emitters 120a and/or 120b every predetermined time so that the infrared emitters 120a and/or 120b can emit the infrared ray intermittently to cooperate with the photographing action of the image sensors 110a and/or 110b. In this example, only before the image sensors 110a and/or 110b perform the image capturing, the infrared emitters 120a and/or 120b emit the infrared ray so that the energy can be saved.

It is noted that the architecture of the integrated driving assistance apparatus of the present invention is not limited to the architectures of the embodiments disclosed above, but can be changed with the need of the actual application. For example, the image sensors and the infrared emitters of the present invention can be only located on one of the side-view mirrors. For example, the driving assistance apparatus can just include the image sensor 110a and the infrared emitter 120a located on the right-side-view mirror to compensate poor right side vision due to the location of left side of the driver's seat. Besides, in another embodiment, when an on state of the right turn signal light 106a is detected, the processor 130 can only process the image captured by the image sensor 110a on the right-side-view mirror for the blind spot detection alarm. In other words, when the vehicle turns right, the detection can be performed only for the blind spot area at right side of the vehicle, and when the vehicle turns left, the detection can be performed only for the blind spot area at left side of the vehicle.

Figure 3:
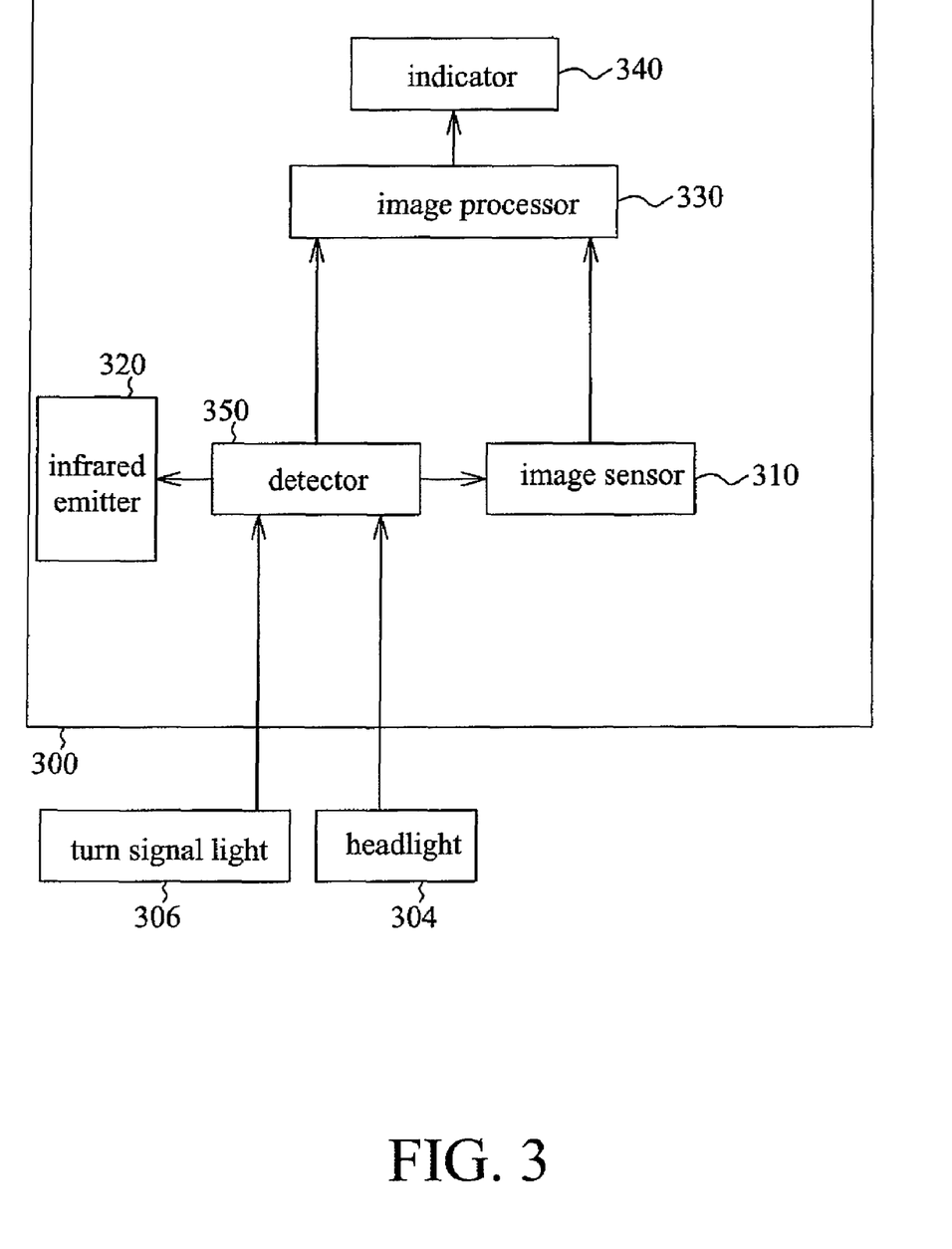
FIG. 3 shows a block schematic diagram of an integrated driving assistance apparatus according to an embodiment of the present invention.

FIG. 3 shows a block schematic diagram of an integrated driving assistance apparatus 300 according to an embodiment of the present invention. The integrated driving assistance apparatus 300 is installed on a vehicle, and includes an image sensor 310, an infrared emitter 320, an image processor 330, an indicator 340, and a detector 350. The detector 350 is used for detecting an on/off state of a turn signal light 306 to determine whether the vehicle makes a turn or a lane change and for detecting an on/off state of a headlight 304 to determine whether the vehicle is driven at night or under poor vision. The image sensor 310 and the infrared emitter 320 are located on a side-view mirror of the vehicle (for example, inside or under the side-view mirror) and used to capture images and irradiate infrared ray for the area at rear sides of the vehicle.

The detector 350 is coupled to the infrared emitter 320. When the detector 350 detects that the headlight 304 is turned on, it will transmit an enable signal to the infrared emitter 320 to enable the infrared emitter 320 to irradiate infrared ray. However, when the detector 350 detects that the headlight 304 is turned off, it will transmit a disable signal to the infrared emitter 320 to turn the infrared emitter 320 off.

The image processor 330 is coupled to the image sensor 310 to receive and process an image signal captured by the image sensor 310. Also, the image processor 330 is coupled to the detector 350. When the detector 350 detects that the turn signal light 306 is turned on, the image processor 330 processes the received image for a blind spot detection alarm. However, when the detector 350 detects that the turn signal light 306 is turned off, the image processor 330 processes the received image for a lane deviation alarm. Generally speaking, the image processing for the blind spot detection alarm is used to divide the images captured by the image sensor 310 into several image blocks. When the other vehicles or objects are shown on one of the image blocks nearest the vehicle body, the image processor 330 will generate a warning signal to the indicator 340. In addition, the image processing for the lane deviation alarm is used to monitor a distance between a line of the lane and the vehicle body based on the image captured by the image sensor 310. The overlap between the vehicle body and the line of the lane represents that the vehicle is deviated from the lane. At this time, the image processor 330 will generate a warning signal to the indicator 340. Generally speaking, because the amount of light reflected by the line of the lane is larger than that reflected by the other portions of the lane, the location of the line of the lane can be detected, for example, by detecting the brightness change of the road image.

It is noted that besides detecting the on/off state of the turn signal light 306, the present invention also can determine whether to process the image for the blind spot detection alarm or not by detecting the rotation of the steering wheel or the location of the actuating stick.

The indicator 340 is coupled to the image processor 330, and can receive the warning signal generated by the image processor 330 and show the warning signal through various ways to warn the driver to take suitable measures. For example, the indicator 340 can be a vision-based indicator (for example, an LCD display), hearing indicator (for example, a horn), vibrator, or voice and light warning instrument.

In another embodiment, the image sensor 310 can be also coupled to the detector 350 to receive the detection signal of the turn signal light 306 from the detector 350. The image sensor 310 can adjust the angle of the captured images by itself based on the on/off state of the turn signal light 306. For example, when the turn signal light 306 is turned on, it represents that the image processor 330 will process the image for the blind spot detection alarm so that the image sensor 310 can capture the image for the blind spot area which always exists when driving. However, when the turn signal light 306 is turned off, it represents that the image processor 330 will process the image for the lane deviation alarm so that the image sensor 310 can capture the ground image beside the vehicle.

Figure 4:
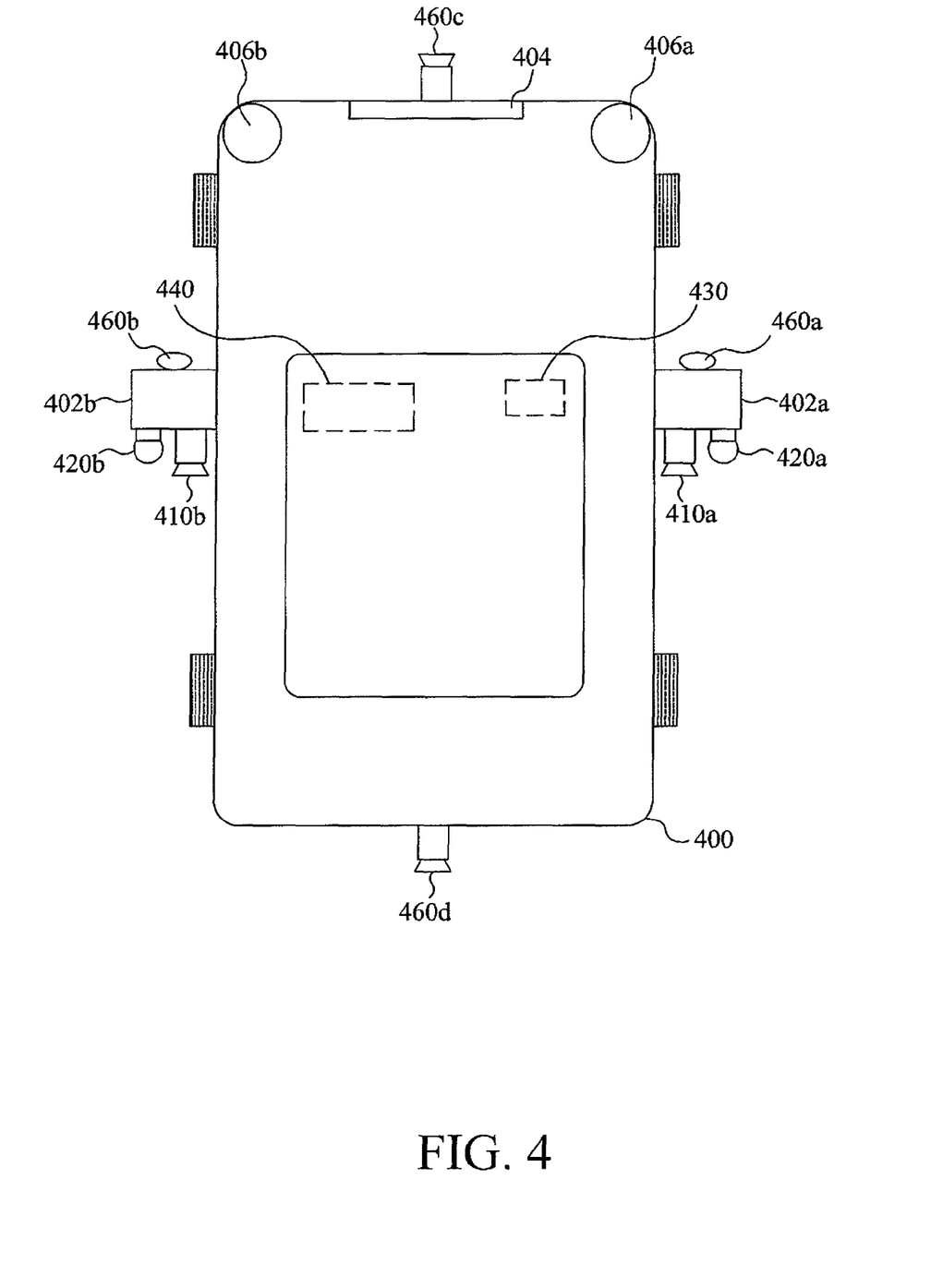
FIG. 4 is a schematic diagram illustrating an integrated driving assistance apparatus with auxiliary capability of a panoramic image.

In another embodiment of the present invention, besides the image processing for the blind spot detection alarm and the lane deviation alarm, the integrated driving auxiliary apparatus of the present invention is also capable of providing a panoramic image. FIG. 4 is a schematic diagram which illustrates an integrated driving assistance apparatus with assistance capability of a panoramic image. In this embodiment, driving assistance apparatus includes image sensors 410a and 410b and infrared emitters 420a and 420b, which are located on the side-view mirrors 402a and 402b of the vehicle 400 respectively. The image sensors 410a and 410b and the infrared emitters 420a and 420b are working consistent with the headlight 404 and the turn signal lights 406a and 406b of the vehicle 400. The image captured by the image sensors 410a and 410b is processed by the image processor 430 and showed on the indicator 440, as the above description relating to FIG. 1. Furthermore, in this embodiment, the driving assistance apparatus of the present invention can further include four ground image sensors 460a, 460b, 46c, and 460d, which are located on the right, left, front, and rear sides of the vehicle body to capture a rightward ground image, a leftward ground image, a frontward ground image, and a rearward ground image respectively. For example, the ground image sensors 460a, 460b can be located on the side-view mirrors 402a and 402b respectively, and the ground image sensors 460c and 406d can be located on the front and rear sides of the vehicle 400 body respectively. The ground image sensors 460a, 460b, 460c, and 460d are capable of capturing the visible light and/or infrared images, and each of them can be, for example, a complementary metal oxide semiconductor (CMOS) image sensor or a charge coupled device (CCD) image sensor.

Figure 5A:
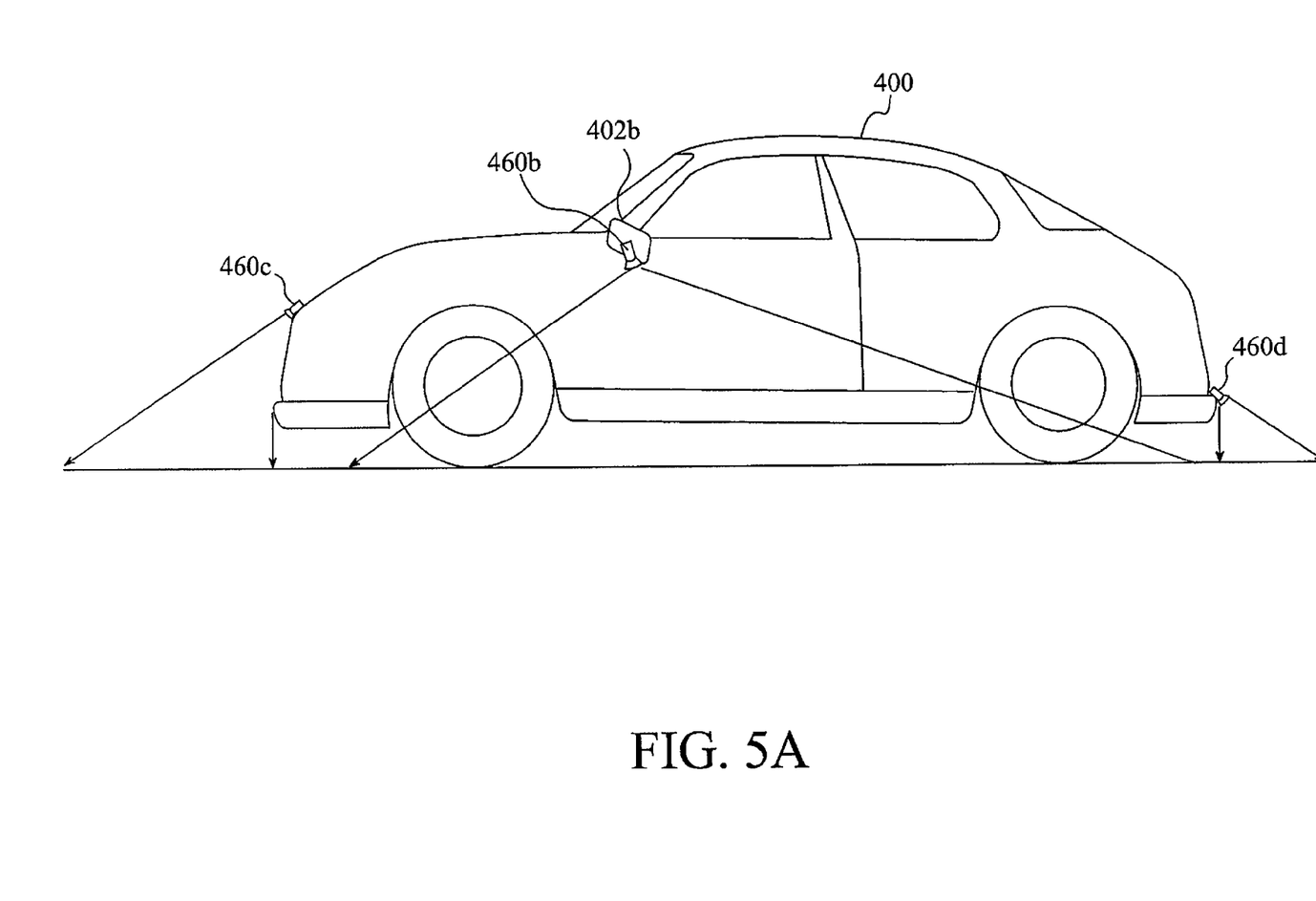
FIGS. 5A and 5B are schematic diagrams illustrating the location and capturing range of the ground image sensors shown in FIG. 4.
Figure 5B:
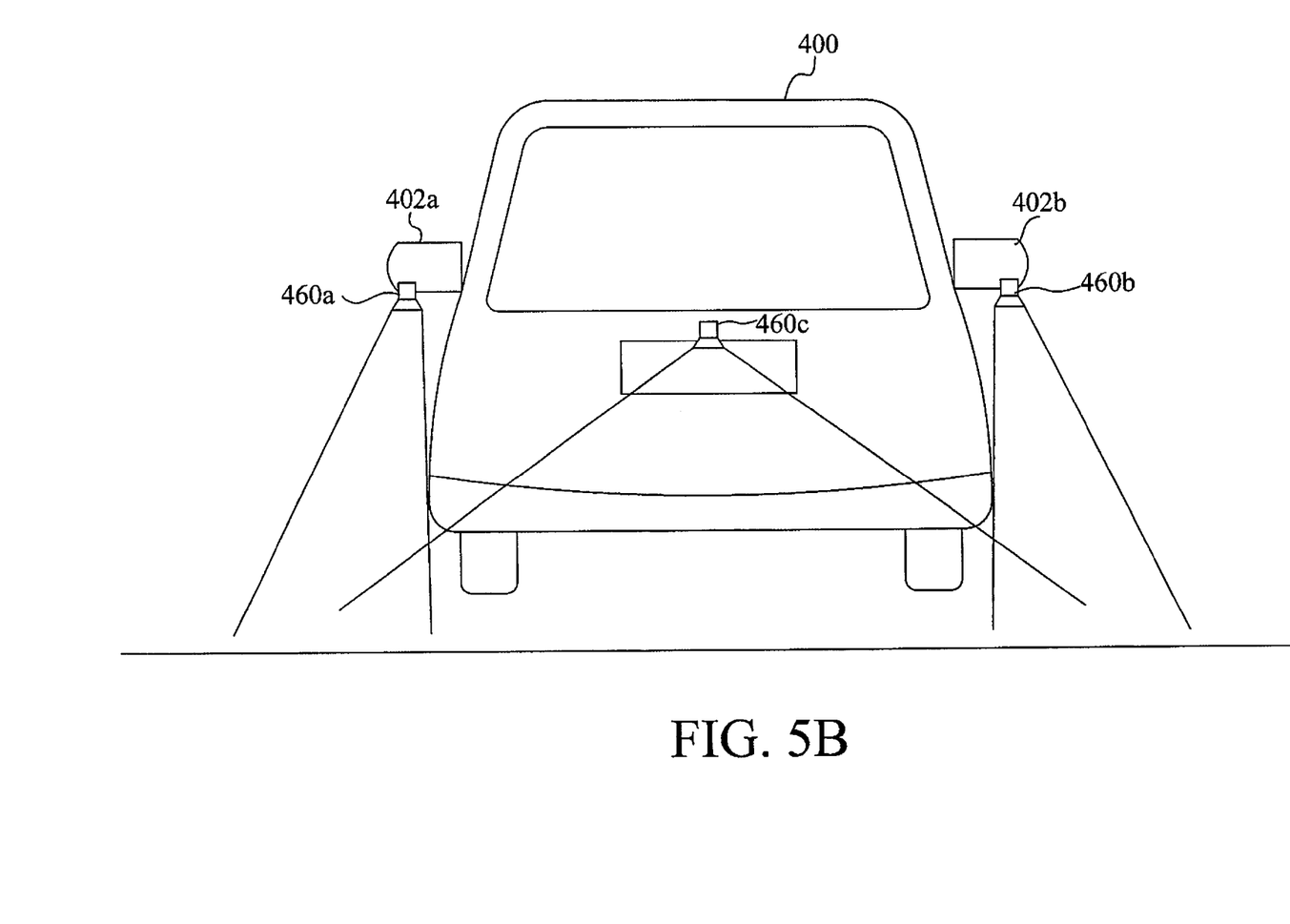

FIGS. 5A and 5B are schematic diagrams illustrating the location and capturing range of the ground image sensors 460a, 460b, 460c, and 460d shown in FIG. 4. The ground image sensors 460a, 460b, 460c, and 460d of the present invention are capable of capturing a rightward ground image, a leftward ground image, a frontward ground image, and a rearward ground image of the vehicle 400 respectively. The angle of each ground image sensor can be adjusted to get perfect images. For example, because the location of the side-view mirror is closer to the front side of the vehicle 400, when the ground image sensor 460b is located on the side-view mirror 402b, the angle of the ground image sensor 460b needs to be adjusted to allow the ground image sensor 460b to capture the more perfect leftward ground image. Generally speaking, the image sensors 410a and 410b and the ground image sensors 460a and 460b can all be located on the side-view mirrors 402a and 402b. The purpose of the image sensors 410a and 410b is mainly to capture the images over rear-right area, rear-left area and lower backward area of the vehicle 400, but the purpose of the ground image sensors 460a and 460b is mainly to capture the rightward and leftward ground images of the vehicle 400, as shown in FIGS. 5A and 5B.

After the image processor 430 in FIG. 4 receives the image signals from the ground image sensors 460a, 460b, 460c, and 460d (i.e., signals of the rightward, leftward, frontward, rearward ground images of the vehicle 400), then it can perform the image processing (for example, image distortion correction and image synthesized process) to synthesize a panoramic image like a top view. The image is then transmitted to the indicator 440.

Figure 6:
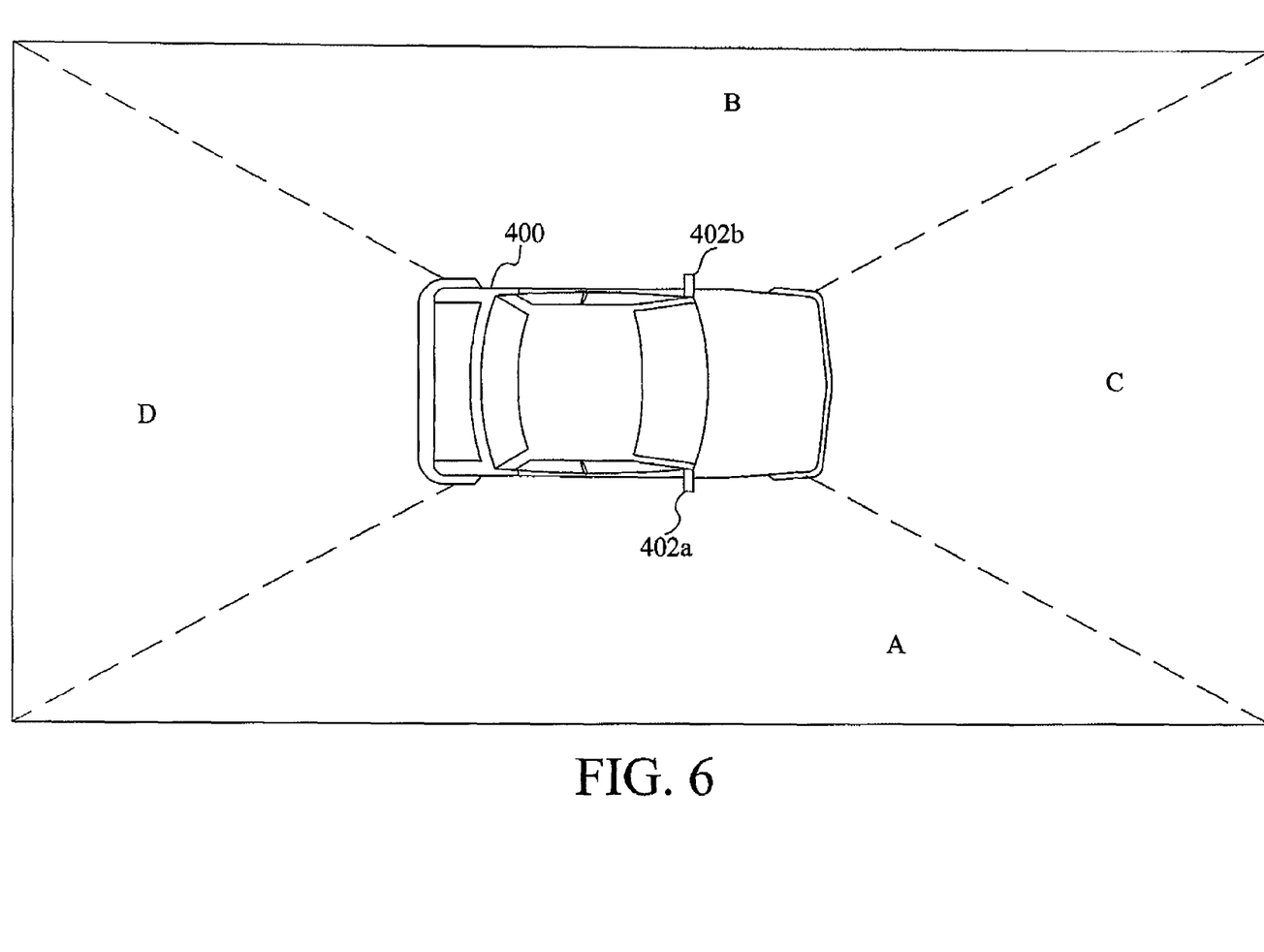
FIG. 6 illustrates a panoramic image processed by the image process.

FIG. 6 illustrates the panoramic image processed by the image processor 430, wherein areas A, B, C, and D in the image correspond to the signals captured by the ground image sensors 460a, 460b, 460c, and 460d respectively. Through the indicator 440, the panoramic image is provided to the driver as driving reference, and then the effect of assistance in safety driving is achieved.

Figure 7:
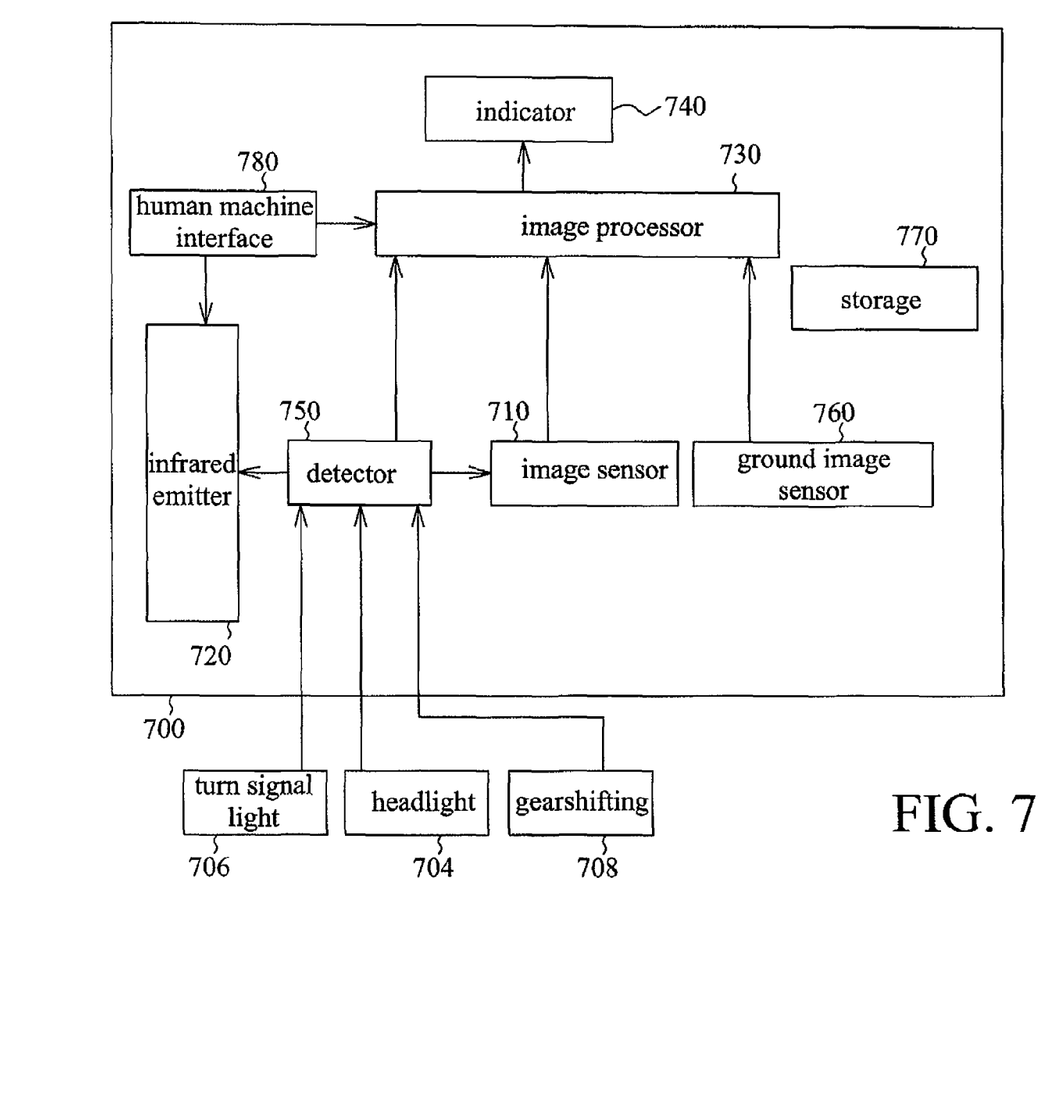
FIG. 7 shows a block schematic diagram of an integrated driving assistance apparatus according to an embodiment of the present invention.

FIG. 7 shows a block schematic diagram of an integrated driving assistance apparatus 700 according to an embodiment of the present invention. The integrated driving assistance apparatus 700 is installed on a vehicle, and it includes an image sensor 710, an infrared emitter 720, an image processor 730, an indicator 740, and a detector 750. By detecting the on/off states of a turn signal light 706 and a headlight 704, the detector 750 can determine the on/off states of the image sensor 710 and the infrared emitter 720 and control the image processor 730 to process the image for a lane deviation alarm or a blind spot detection alarm. The working principles of these elements are like the working principles of the same elements in FIG. 3 so it is omitted.

The integrated driving assistance apparatus 700 further includes ground image sensor 760 used for capturing the frontward, rearward, leftward, and rightward ground images. The ground image sensor 760 is coupled to the image processor 730, and transmits the captured images to the image processor 730 for image processing. In this embodiment, the detector 750 is capable of detecting the position of the gearshift 708, too. When the detector 750 detects that the gearshift 708 is in a reverse position, the image processor 730 can generate a panoramic image or a rearward image of the vehicle by distortion correction and/or image synthesis of the image processing and then transmit the image to the indicator 740. In other words, when the vehicle is driven back or stopped, the indicator 740 can show the panoramic image or the rearward image of the vehicle to provide the driver with more complete driving information.

The integrated driving assistance apparatus 700 further includes a storage 770 and a human machine interface 780, wherein the storage 770 is configured to record all kinds of digital data, and the human machine interface 780 is configured to receive a user's input to control operation of the image processor 730 and/or the infrared emitter 720. For example, the storage 770 is used to record the image captured by the image sensor 710 or the frame data processed by the image processor 730. Besides, the driver can initiate the lane deviation alarm or the blind spot detection alarm of the image processor 730, control image processor 730 to generate the panoramic image, or turn on or off the infrared emitter 720 manually by the Man-machine interface 780.

In an embodiment, the panoramic image generated by the image processor 730 can be shown on the indicator 740 all the time when the vehicle is driven. In another embodiment, the panoramic image is shown on the indicator 740 only if the detector 750 detects that the gearshift is in a reverse position. Also, in another embodiment, the driver can determine whether the panoramic image is shown or not by himself. It is noted that no matter the image is shown on the indicator 740 or not, the image data processed by the image processor 730 or captured by the image sensor 710 and/or ground image sensor 760 all can be recorded in the storage 770 to be the driving records of the vehicle.

The integrated driving assistance apparatus of the present invention can provide the driver with different functions for assisting driving vision, including auxiliary illumination of the infrared, the lane deviation alarm, the blind spot detection alarm, and the panoramic image based on the driving states of the vehicle (for example, driving forward, turning left, turning right, or backing a vehicle) These above functions can provide the driver with the most suitable driving information to improve the driving safety.

The above description only illustrates the preferred embodiments of the present invention, and is not intended to limit the scope of the present invention. Any other equivalent variations or modifications falling within the spirit of the disclosed present invention all should be included in the following claims.

The invention claimed is:

1. An integrated driving assistance apparatus installed in a vehicle with a headlight, a turn signal light, and a side-view mirror, the integrated driving assistance apparatus comprising:
    a detector configured to detect whether the headlight and the turn signal light are turned on or off respectively;
    an infrared emitter located on the side-view mirror, the infrared emitter irradiates infrared ray when the detector detects that the headlight is turned on;
    an image sensor located on the side-view mirror for capturing an image of an area beside the vehicle; and
    an image processor coupled to the image sensor and the detector, the image processor configured to receive and process the image to generate a warning signal;
    wherein when the detector detects that the turn signal light is turned off, the image processor processes the image for a lane deviation alarm, and when the detector detects that the turn signal light is turned on, the image processor processes the image for a blind spot detection alarm.

2. The apparatus of claim 1, further comprising an indicator coupled to the image processor and configured to receive and show the warning signal.

3. The apparatus of claim 2, wherein the indicator is a liquid crystal display (LCD), an organic light emitting diode (OLED) display, a plasma display, or a cathode ray tube (CRT) display.

4. The apparatus of claim 3, wherein the indicator is located on a vehicle instrument panel.

5. The apparatus of claim 3, wherein the indicator is located on the side-view mirror.

6. The apparatus of claim 2, wherein the indicator comprises a projector configured to project the warning signal onto a front windshield of the vehicle.

7. The apparatus of claim 2, wherein the indicator is a horn.

8. The apparatus of claim 2, wherein the indicator is a vibrator.

9. The apparatus of claim 2, wherein the indicator receives the warning signal through a wireless transmission interface selected from the group consisting of Bluetooth, infrared, and wireless USB.

10. The apparatus of claim 2, wherein the indicator receives the warning signal through a wire transmission interface selected from the group consisting of USB, IEEE1394, and RS232.

11. The apparatus of claim 2, further comprising four ground image sensors coupled to the image processor for capturing a rearward ground image, a frontward ground image, a rightward ground image, and a leftward ground image.

12. The apparatus of claim 11, wherein the image processor receives the rearward ground image, the frontward ground image, the rightward ground image, and the leftward ground image, and generates a corresponding panoramic image.

13. The apparatus of claim 12, further comprising a storage configured to record the image captured by the image sensor, the rearward ground image, the frontward ground image, the rightward ground image, and the leftward ground image captured by the ground image sensors, or the corresponding panoramic image.

14. The apparatus of claim 12, wherein the vehicle comprises a gearshift, and when the detector detects that the gearshift is in a reverse position, the indicator shows the corresponding panoramic image.

15. The apparatus of claim 12, further comprising a Man-machine interface configured to receive a user's input to control operation of the image processor and an on/off state of the infrared emitter.

16. The apparatus of claim 1, wherein the image sensor is a complementary metal oxide semiconductor (CMOS) image sensor or a charge coupled device (CCD) image sensor.

17. The apparatus of claim 1, wherein the image sensor is capable of capturing visible light and infrared.

18. The apparatus of claim 1, further comprising a drive unit connected to the image sensor for driving the image sensor to rotate or shift.

19. The apparatus of claim 18, wherein the drive unit further comprises a motor and a gear.

20. The apparatus of claim 1, wherein when the detector detects that the headlight is turned off, the infrared emitter is turned off.

21. The apparatus of claim 1, wherein the side-view mirror of the vehicle comprises a left-side-view mirror and a right-side-view mirror, and the integrated driving assistance apparatus further comprises:
   two infrared emitters located on the left-side-view mirror and right-side-view mirror respectively; and
   two image sensors located on the left-side-view mirror and right-side-view mirror respectively.

22. The apparatus of claim 21, wherein the turn signal light of the vehicle comprises a left turn signal light and a right turn signal light, and wherein when the detector detects that the right turn signal light is turned on, the infrared emitter and the image sensor located on the right-side-view mirror are turned on and the infrared emitter and the image sensor located on the left-side-view mirror are turned off.

* * * * *